Oct. 17, 1950 — J. W. DAWSON — 2,525,872

CONDENSER DISCHARGE SYSTEM

Filed Dec. 26, 1940

INVENTOR.
JOHN W. DAWSON,
By Elmer J. Gorn
ATTY.

Patented Oct. 17, 1950

2,525,872

UNITED STATES PATENT OFFICE 2,525,872

CONDENSER DISCHARGE SYSTEM

John W. Dawson, Auburndale, Mass., assignor to Raytheon Manufacturing Company, Newton, Mass., a corporation of Delaware Application December 26, 1940, Serial No. 371,726

13 Claims. (Cl. 171—97)

This invention relates to condenser discharge systems, and more particularly to those systems in which electrical energy is stored in a condenser and then discharged into a load circuit in order to deliver a pulse of current to a load. In ordinary condenser discharges of this kind, the current in the load circuit is either oscillatory or critically damped. In many instances, oscillations are undesirable as where it is desired to obtain a unidirectional pulse of current through the load. Critical damping introduces limitations in the peak value of current obtainable and usually results in undesirable losses in the resistance elements necessary for critical damping.

An object of this invention is to obtain a substantially unidirectional current from the discharge of a condenser without the use of critical damping.

Another object is to secure a substantially complete transfer of energy from a charged condenser to a load without substantial return of said energy from said load to said condenser so that the amount of energy delivered to the load can be accurately determined by charging a condenser to a predetermined voltage.

Another object is to devise a condenser discharge system in which the load current rises rapidly and decreases substantially exponentially.

A further object is to increase the efficiency of the utilization of power in such condenser discharge system, and thus enable smaller apparatus to be used for a desired amount of power.

A further object is to provide a system of the above type in which uniformity in current magnitude and form is secured for successive operations.

A still further object is to devise such an arrangement which is simple, reliable, and inexpensive.

The foregoing and other objects of this invention will be best understood from the following description of exemplifications of my invention, reference being had to the accompanying drawing wherein.

Figure 1:
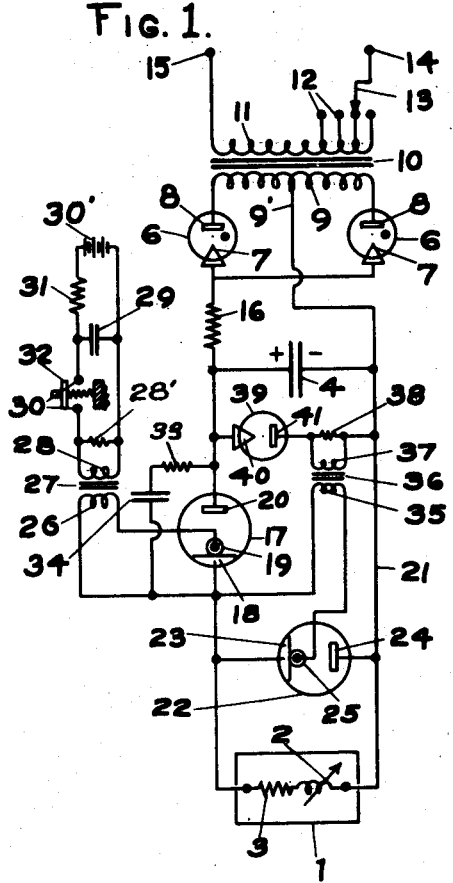
Fig. 1 is a diagram of a condenser discharge system embodying my invention.

In the arrangement illustrated, current is to be supplied to a load device 1. This load device usually contains a certain amount of inductance indicated schematically at 2 and resistance indicated schematically at 3. The current to the load device is to be supplied from a condenser 4. The condenser 4 may be of any convenient form. Since in most embodiments of my invention the current through this condenser is substantially unidirectional, an electrolytic condenser may conveniently be utilized. The condenser 4 is adapted to be charged from any suitable source of direct current, such as, a direct current generator, battery, rectifier, or the like. In the drawing, the direct current is shown as being supplied from a pair of rectifier tubes 6. These tubes may be of the gas or vapor filled type having permanently energized cathodes 7. These cathodes may be of the thermionic filament type, or any other suitable type of cathode. The rectifier tubes 6 are provided with anodes 8 which are connected to opposite sides of the secondary winding 9 of a charging transformer 10. This charging transformer is provided with a primary winding 11. The primary winding 11 may be provided with a series of taps 12 so as to adjust the value of voltage which is supplied to the condenser 4. A connection 13 extends from one of the taps 12 to a terminal 14 while the other side of the primary winding 11 is connected to a terminal 15. The terminals 14 and 15 are adapted to be connected to a suitable source of alternating current. The two cathodes 7—7 are connected together through a current limiting resistance 16 to the positive side of the condenser 4. The secondary winding is provided with a center tap 9' which is connected to the negative side of the condenser 4.

The condenser 4 is adapted to be discharged into the load 1 by means of a controlled ignition discharge tube 17. This tube is preferably of the pool cathode type with an igniter for initiating a cathode spot on the pool in order to cause the tube to conduct current. Although any suitable type of igniter may be used, it preferably is of the type described and claimed in the copending application of Percy L. Spencer, Serial No. 303,963, filed November 13, 1939, now Patent Number 2,290,897, dated July 28, 1942, for an improvement in Arc Igniting Devices, consisting of a conductor separated and insulated from the cathode by a thin glass layer. The tube 17 is provided with a pool cathode 18, preferably of mercury, an igniter 19, preferably of the type as described above, and an anode 20. The anode 20 is connected to the positive side of the condenser 4 while the cathode is connected to one side of the load device 1. The negative side of the condenser 4 is connected through a conductor 21 to the other side of said load device 1.

In accordance with my invention, a shunt circuit of low impedance is established across the load device 1 at a predetermined time in the operation of the system. In order to establish such a shunt circuit, a controlled ignition tube 22 is connected across the load device 1. The tube 22 is preferably of the same type as the tube 17 and therefore has a pool type cathode 23, an anode 24 and an igniter 25. As indicated in connection with the tube 22, this igniter may be of any convenient type, but is preferably of the electrostatic type described more fully in connection with said tube 17. The cathode 23 is connected to the same side of the load device as the cathode 18, the anode 24 being connected to the opposite side of said load device.

When the terminals 14 and 15 are supplied with alternating current, unidirectional charging current is supplied through the rectifiers 6 to the condenser 4 so that said condenser charges up to a potential as determined by the setting of the taps 12 on the charging transformer 10. In this way, a predetermined amount of energy is stored in the condenser 4, the amount of energy being controlled by the setting of the taps 12. In some instances, it may be desirable to have the condenser 4 adjustable in size as by utilizing a plurality of condensers which may be connected into the circuit at will. The control of the size of the condenser 4 is another means of controlling the amount of energy stored therein.

The tube 17 is normally non-conducting and thus the condenser 4 retains its charge and the tube 17 is ignited. The igniter 19 is supplied with an igniting impulse from the secondary winding 26 of an igniting transformer 27. This transformer is provided with a primary winding 28 which is supplied with current impulses from a condenser 29. One side of this condenser is connected to one side of the primary winding 28, while the other side is connected through a pair of normally open contacts 30 to the other side of said primary winding. The condenser 29 is adapted to be charged with direct current from a suitable source, such as a battery 30', connected in series with a current limiting resistance 31. The contacts 30 are adapted to be closed by a pushbutton 32. A resistance 28' is preferably connected across the primary winding 28 in order that the igniting impulse which is supplied to the igniter 24 is substantially unidirectional. This action is more fully described and claimed in the copending application of Wilcox P. Overbeck, Serial No. 271,679, filed May 4, 1939, now Patent No. 2,270,601, for an improvement in Arc Tube Systems.

When the contacts 30 are closed by the pushbutton 32, the condenser 29 discharges through the primary winding 28 and delivers an igniting impulse to the igniter 19. This igniting impulse initiates an arc spot on the cathode 18 and the tube 17 starts to conduct current. Since at this time the anode 20 is positive with respect to the cathode 18, due to the charge on the condenser 4, current will flow from the anode 20 to the cathode 18 causing the condenser 4 to discharge. This discharge current flows through the load device 1 delivering a pulse of current thereto. In order to insure a reliable firing of the tube 7, a series circuit consisting of a substantially non-inductive resistance 33 in series with a condenser 34 is connected between the anode 20 and its cathode 18. The action of this circuit is more fully described and claimed in said copending application of Wilcox P. Overbeck, Serial No. 271,679.

The discharge current from the condenser 4 will cause the voltage on said condenser to fall to zero and then tend to reverse. The tube 22 is adapted to be ignited substantially at this point in order to complete the shunt circuit mentioned above. For this purpose, the igniter 25 is supplied with igniting impulses from the secondary winding 35 of an ignition transformer 36 whose primary winding 37 is connected across a resistance 38. The resistance 38 is connected in series with a rectifying tube 39. The rectifier tube 39 may be of small current-carrying capacity, but preferably is one which can satisfactorily withstand the negative voltage applied to the condenser 4. The rectifier tube 39 is provided with a permanently energized cathode 40 connected to the positive side of the condenser 4 and also with an anode 41 connected through the resistance 38 to the negative side of the condenser 4. In this way the voltage across the tube 39 is the voltage on the condenser 4. Due to the polarity of the connections described above, the tube 39 ordinarily does not conduct current. However, when the voltage across the condenser 4 reverses as will be described below, the voltage across the tube 39 likewise reverses and therefore causes current to start flowing through said tube. This current flow sets up a voltage across the resistance 38 which is impressed upon the primary winding 37 and thus supplies an igniting impulse through the secondary winding 35 to the igniter 25. The tube 22 thereupon starts to conduct current and furnishes a short-circuited path across the load device 1. Only a relatively small voltage drop across the resistance 38 is needed to supply the igniting impulse to the igniter 25. Therefore this action occurs within a relatively short-time interval after the point at which the voltage on the condenser 4 reverses. The resistance 16 not only limits the charging rate of the condenser 4 but also tends to prevent any reverse charge on said condenser from discharging back through the rectifiers 6.

Figure 2:
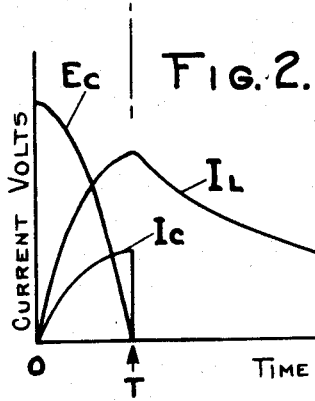
Fig. 2 is a set of curves illustrating the mode of operation of my invention.

The nature of the discharge current from the condenser 4 flowing through the load device 1 will be best understood by referring to the curves of Fig. 2. In Fig. 2 the time at which the tube 17 is ignited is represented as the initial time. As illustrated, the curve $I_c$ represents the discharge current through the condenser 4 which rises to a maximum value and at the same time the voltage $E_c$ across the condenser falls to zero. During this period the current $I_L$, which represents the current delivered to the load device 1, likewise rises rapidly to a maximum value. During this initial period, the currents $I_c$ and $I_L$ are substantially the same although they are plotted to different scales on Fig. 2. At the point T, a maximum of current is flowing in the load circuit. At this time substantially all of the energy of the condenser 4 has been transferred to the load circuit. That portion of the energy which has not already been consumed in the resistance 3 of the load is substantially all stored in the magnetic field of the inductance 2.

In ordinary condenser discharge systems, the energy stored in the magnetic field of the load circuit, after reaching the maximum value at the time T, would tend to be transferred back so as to recharge the condenser 4 in the opposite direction. In ordinary condenser discharge systems, therefore, the current in the load circuit would become oscillatory. Likewise, the voltage across the condenser 4 would tend to reverse and oscillate in a similar manner. In this invention, however, such reversal of the voltage in the condenser 4 is prevented because on such reversal tending to occur, the tube 22 which previously had been non-conducting, is ignited as described above. Furthermore, the anode 24 which previously had been negative with respect to its cathode 23 tends to become positive with respect thereto. Thus the discharge or arc at the time T transfers from the tube 17 to the tube 22. At this instant, therefore, the current flowing from the anode 20 ceases and the current from the condenser 4 drops to zero leaving the condenser substantially entirely discharged. The load device I now being short-circuited through the path between the anode 24 and the cathode 23, the energy from said load device I cannot be transferred back to the condenser 4. Also, since the short-circuit path has very little energy consumption, very little energy can be taken from the load device I. Therefore, the current in the load circuit will decay substantially exponentially, as indicated by the curve $I_L$. During this decay, substantially all of the energy is consumed in the resistance of the load circuit I where it is intended and desired to be utilized. If the current in the load device I were permitted to be oscillatory, the form thereof may be given by the following formula to a satisfactory degree of accuracy:

$$I_o = \frac{E}{L\sqrt{\frac{1}{LC} - \frac{R^2}{4L^2}}} \epsilon^{-\frac{R}{2L}t} \sin\sqrt{\frac{1}{LC} - \frac{R^2}{4L^2}} t$$

where

E = maximum voltage on condenser 4;
t = time in seconds;
C = capacity in farads of the condenser 4;
L = inductance in henries of the load circuit;
R = resistance in ohms of the load circuit.

The current $I_L$ follows the above form until the time T is reached thereafter.

$$I_L = I \epsilon^{-\frac{R}{L}t}$$

where I = the value of the current at the time T, which is substantially a quarter part of the oscillatory current $I_o$. It will be noted that the exponential $$-\frac{R}{L}$$

in the above equation is twice the value of the exponential factor $$-\frac{R}{2L}$$

in the case of the oscillatory current $I_o$. This shows that the stored energy of the condenser in the present invention is released in substantially half the time required in the case of ordinary oscillatory condenser discharges.

As indicated above, the load device I contains considerable inductance represented diagrammatically at 2. This inductance is indicated as being variable. Such variation may be produced in any well-known convenient manner. Adjustment of the inductance 2 can be used to alter the shape of the load current both as to the rate of increase and rate of decrease. Increasing the value of the inductance 2 will cause the load current both to increase and decrease at a slower rate, whereas a decrease in the value of said inductance causes the increase and decrease to be faster.

Figure 3:
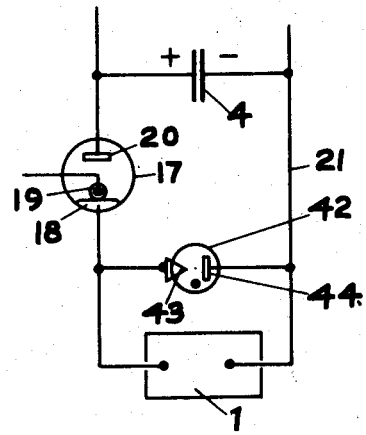
Figs. 3 and 4 are fragmentary diagrams of variations of the system illustrated in Fig. 1.

In the arrangement described above, the tube 22 is deenergized up to the time at which the anode 24 becomes positive and it is desired to have the tube 22 conduct. Such an arrangement enables the tube 22 to withstand comparatively high voltages which may be built up on the condenser 4. However, it will be seen that the desired conduction of current in the tube 22 does not take place until the anode 24 becomes positive and therefore in some instances a rectifier with a permanently energized type of cathode may be used for the tube 22. Such an arrangement is shown in Fig. 3 in which the same reference numerals are applied where the elements are identical with those shown in Fig. 1. In the case of Fig. 3, the tube 22 is replaced by a rectifier tube 42. This tube is preferably of the type having a gas or vapor filling and capable of carrying relatively heavy currents at low voltage drop in the presence of the ionization of the gas or vapor. The tube 42 has a permanently energized cathode 43 of any suitable type. This cathode may conveniently be a thermionic filament or any other well-known type of permanently energized cathode, such as, a pool cathode with a keep-alive arc. The cathode 43 is connected to the left-hand side of the load device I. The tube 42 is also provided with an anode 44 connected to the other side of said load device.

The operation of the modification shown in Fig. 3 is exactly the same as that described in connection with Fig. 1. The tube 17 is initially ignited and the condenser 4 is discharged through said tube and the load device I. At the time T, as indicated in Fig. 2, the tendency for the voltage to reverse across the cathode 4 causes a discharge to start flowing through the tube 42 and causes the tube 17 to become extinguished. Thereafter the tube 42 provides a short-circuited path across the load device I, and the current decays along the exponential curve $I_L$, as indicated in Fig. 2.

Figure 4:
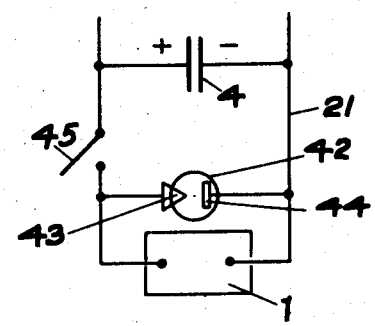

Both in the case of Fig. 1 and Fig. 3, the tube 17 need not perform any rectifying action, this tube performing primarily as a switch. It is possible, therefore, in some instances, to replace the tube 17 by a mechanical switch as illustrated by the modification represented by Fig. 4. In this figure likewise identical reference numerals are applied to elements which are identical with those represented in Figs. 1 and 2. In Fig. 4, the tube 17 is replaced directly by some suitable form of mechanical switch 45. Thus, the closure of the switch 45 closes the discharge circuit from the condenser 4 directly through the load device I.

The operation of the system shown in Fig. 4 is substantially identical with that shown in Fig. 3 except that the connection established by the switch 45 may be maintained closed even after the tube 42 has started to conduct current. However, since the voltage drop across the tube 42 is very low as compared with the total voltage originally supplied to the condenser 4, only an insignificant amount of reverse current will flow to said condenser. Also, the resistance 16 will tend to prevent an excessive amount of direct current from flowing directly from the direct current source through the load device I. In some instances, it may be desirable to deenergize the rectifiers 6 as by disconnecting the charging transformer 10 from the alternating current line when the condenser 4 has charged to the desired voltage before the switch 45 is closed. In this way, any tendency for the charging current source to supply direct current to the load will be eliminated.

Figure 5:
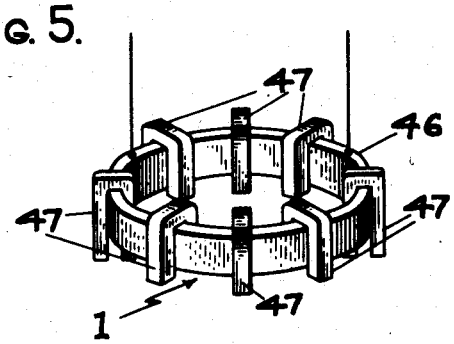
Fig. 5 is a view of a magnetizing arrangement constituting one type of load device which may be used in the system shown in Fig. 1.

In the invention as described abrove, each discharge of the condenser 4 supplies a unidirectional pulse of current to the load device. The exact value of this pulse of current including the peak value thereof and the energy content thereof can be accurately determined as described above. This type of current is useful in many kinds of load devices. For example, one such load device is shown in Fig. 5, and consists of an arrangement for magnetizing individual magnets. In this arrangement, the load device consists of a coil 46 comprising any desired number of conducting turns. Over the coil 46 may be hung individual magnetic structures 47 made of a material of high magnetic retentivity and which are to be magnetized by supplying a pulse of direct current to the coil 46. By connecting the device of Fig. 5 as the load device 1 in any of the arrangements described above, each discharge of the condenser 4 will supply a pulse of direct current to the coil 46 which will tend to magnetize the magnetic structures 47. In an arrangement of this kind, currents of large peak magnitude, which therefore generate large magnetomotive forces in the coil 46, can be secured without drawing such large peak currents from the power lines.

In the various embodiments described above, it is to be understood that the constants are so chosen that following the energization of the terminals 14 and 15, the condenser 4 is charged to its predetermined desired voltage before the tubes 17 or the switch 45 are closed to effect a discharge of said condenser. In those cases where this sequence of operations occurs automatically, the speed of the automatic timing arrangement used is of the proper value to insure full charge of the condenser 4 before each discharge thereof. If the sequence of operations is determined by the operator, he merely adopts the precaution of timing the individual discharges below a certain predetermined maximum speed.

Of course it is to be understood that this invention is not limited to the particular details as described above inasmuch as many equivalents will suggest themselves to those skilled in the art. For example, certain aspects of this invention can be applied to systems which do not utilize condensers but which supply a pulse of current to the load. In such cases my invention may be utilized to cause an exponential decay of such a pulse of current. Also there are other circuit-closing means which can be used to accomplish the various functions performed by the tubes described above. Various ways of obtaining circuits equivalent to those illustrated may be utilized. For example, the shunt rectifier can be coupled across the load in any well-known manner instead of being directly connected across said load. Thus when such a rectifier or shunt circuit is defined as being "connected across the input to said load circuit," or some similar phrase, it is intended that such alternative ways of coupling shall be included. Also where transformation of the load current is desired, a transformer could be used to couple the condenser discharge circuit to the load circuit. Various other ideas as to the utilization of the principles enunciated herein will suggest themselves to those skilled in the art. It is accordingly desired that the appended claims be given a broad interpretation commensurate with the scope of the invention within this art.

What is claimed is:

1. A system comprising condenser means for storing electrical energy, means for discharging said condenser means into a continuous metallically conductive load circuit and means which becomes active upon a tendency for the voltage on said condenser means to reverse for establishing a shunt circuit across the input to said load circuit beyond said discharge means.

2. A system comprising condenser means for storing electrical energy, means for discharging said condenser means into a continuous metallically conductive load circuit and rectifying means connected across the input to said load circuit beyond said discharge means, said rectifying means being of a polarity to conduct current upon the voltage across said input tending to reverse after the initial surge of condenser discharge current.

3. A system comprising condenser means for storing electrical energy, a source of direct current for charging said condenser means, a continuous metallically conductive load circuit, switch means for connecting said condenser means to said load circuit to discharge the charge of said condenser means into said load circuit, and rectifying means connected across the input to said load circuit beyond said switch means, said rectifying means being of a polarity to conduct current upon the voltage across said input tending to reverse after the initial surge of condenser discharge current.

4. A system comprising condenser means for storing electrical energy, a source of direct current for charging said condenser means, a continuous metallically conductive load circuit, controlled ignition discharge tube means for connecting said condenser means to said load circuit to discharge the charge of said condenser means into said load circuit, and rectifying means connected across the input to said load circuit beyond said tube means, said rectifying means being of a polarity to conduct current upon the voltage across said input tending to reverse after the initial surge of condenser discharge current.

5. A system comprising condenser means for storing electrical energy, a source of direct current for charging said condenser means, a continuous metallically conductive load circuit, means for connecting said condenser means to said load circuit to discharge the charge of said condenser means into said load circuit, discharge tube means having a constantly energized cathode and an anode connected across the input to said load circuit beyond said connecting means, said tube means being of a polarity to conduct current upon the voltage across said input tending to reverse after the initial surge of condenser discharge current.

6. A system comprising condenser means for storing electrical energy, a source of direct current for charging said condenser means, a load circuit, means for connecting said condenser means to said load circuit to discharge the charge of said condenser means into said load circuit, a controlled ignition discharge tube connected across the input to said load circuit and means responsive to a reversal of voltage across the input to said load circuit after the initial surge of condenser discharge current for igniting said discharge tube.

7. A system comprising condenser means for storing electrical energy, a source of direct current for charging said condenser means, means for discharging said condenser means into a continuous metallically conductive load circuit, means which becomes active upon a tendency for the voltage on said condenser means to reverse for establishing a shunt circuit across the input to said load circuit and means for varying the D. C. voltage to which said condenser means is charged for varying the amount of energy delivered to said load circuit.

8. A system comprising condenser means for storing electrical energy, a source of direct current for charging said condenser means, means for discharging said condenser means into a continuous metallically conductive load circuit, means which becomes active upon a tendency for the voltage on said condenser means to reverse for establishing a shunt circuit across the input to said load circuit and means for varying the inductance of said load circuit.

9. A system comprising condenser means for storing electrical energy, means for discharging said condenser means into a continuous metallically conductive load circuit and means which becomes active upon reversal of voltage on said condenser for establishing a shunt circuit across the input to said load circuit beyond said discharge means.

10. A system comprising condenser means for storing electrical energy, means for discharging said condenser means into a load circuit and means responsive to a predetermined magnitude of inverse condenser voltage for establishing a shunt circuit across the input to said load circuit.

11. A system comprising condenser means for storing electrical energy, means for discharging said condenser means into a load circuit, the constants of the discharge circuit of said condenser having values to tend to cause said discharge current to be oscillatory and a rectifier across said load circuit beyond said discharge means, said rectifier being of a polarity to become active upon decay of current in said load circuit.

12. A system comprising condenser means for storing electrical energy, means for discharging said condenser means into a continuous metallically conductive load circuit and a rectifier across said load circuit beyond said discharge means, said rectifier being of a polarity to keep current flowing through said load circuit in the same direction as during said discharge upon a tendency for the voltage on said condenser means to reverse.

13. A system comprising condenser means for storing electrical energy, means for discharging said condenser means into a load circuit, a controlled ignition discharge tube connected across the input to said load circuit, means which becomes active upon a tendency for the current in said load circuit to decrease for igniting said discharge tube.

JOHN W. DAWSON.

REFERENCES CITED

The following references are of record in the file of this patent:

UNITED STATES PATENTS

| Number | Name | Date |
| --- | --- | --- |
| 2,235,385 | Rava | Mar. 18, 1941 |
| 2,269,460 | Klemperer | Jan. 13, 1942 |
| 2,315,093 | Languepin | Mar. 30, 1943 |

FOREIGN PATENTS

| Number | Country | Date |
| --- | --- | --- |
| 626,598 | Germany | Feb. 28, 1943 |